US011512368B2

(12) United States Patent
Ludewig et al.

(10) Patent No.: US 11,512,368 B2
(45) Date of Patent: Nov. 29, 2022

(54) METHOD FOR REMOVING FLUORIDE FROM A ZINC-CONTAINING SOLUTION OR SUSPENSION, DEFLUORIDATED ZINC SULFATE SOLUTION AND USE THEREOF, AND METHOD FOR PRODUCING ZINC AND HYDROGEN FLUORIDE OR HYDROFLUORIC ACID

(71) Applicant: MONTANUNIVERSITÄT LEOBEN, Leoben (AT)

(72) Inventors: Fritz Ludewig, Judenburg (AT); Stefan Steinlechner, Leoben (AT); Jürgen Antrekowitsch, Leoben (AT)

(73) Assignee: MONTANUNIVERSITÄT LEOBEN, Leoben (AT)

( * ) Notice: Subject to any disclaimer, the term of this patent is extended or adjusted under 35 U.S.C. 154(b) by 435 days.

(21) Appl. No.: 16/603,157

(22) PCT Filed: Apr. 6, 2017

(86) PCT No.: PCT/EP2017/058303
§ 371 (c)(1),
(2) Date: Oct. 4, 2019

(87) PCT Pub. No.: WO2018/184686
PCT Pub. Date: Oct. 11, 2018

(65) Prior Publication Data
US 2020/0032371 A1 Jan. 30, 2020

(51) Int. Cl.
*C22B 3/00* (2006.01)
*C01B 7/19* (2006.01)
*C22B 3/08* (2006.01)

(52) U.S. Cl.
CPC .............. *C22B 19/22* (2013.01); *C01B 7/196* (2013.01); *C22B 3/08* (2013.01); *C22B 19/26* (2013.01)

(58) Field of Classification Search
CPC ........... C22B 19/22; C22B 3/08; C22B 19/26; C01B 7/196
See application file for complete search history.

(56) References Cited

U.S. PATENT DOCUMENTS

| 2010/0155330 A1* | 6/2010 | Burba ..................... C02F 1/683 252/184 |
| 2015/0275330 A1 | 10/2015 | Boudreault et al. |

FOREIGN PATENT DOCUMENTS

| CN | 102336429 A | * | 2/2012 |
| CN | 102336429 B | | 9/2013 |
| CN | 203393202 U | | 1/2014 |
| CN | 103739048 A | | 4/2014 |
| CN | 105154681 A | | 12/2015 |
| CN | 105274342 A | | 1/2016 |
| CN | 106179180 A | | 12/2016 |
| CN | 108220598 A | * | 6/2018 |
| JP | 2000135480 A | | 5/2000 |
| JP | 2002308621 A | | 10/2002 |
| JP | 2004284903 A | | 10/2004 |
| JP | 2012508106 A | | 4/2012 |
| WO | 2010056742 A1 | | 5/2010 |

OTHER PUBLICATIONS

International Preliminary Report on Patentability and Written Opinion issued in corresponding International Application No. PCT/EP2017/058303, dated Oct. 17, 2019, with English Translation, 20 pages.
International Search Report issued in parallel International Application No. PCT/EP2017/085303, dated Feb. 13, 2018, 7 pages.
Written Opinion issued in parallel International Application No. PCT/EP2017/085303, dated Feb. 14, 2018, 10 pages.
Ruh, A. et al., "Der SDHL-Walzprozess: Ein komplexer Prozess—in aller Kürze", Vernetzung von Zink und Stahl 2009; Heft 118 der Schriftenreihe der GDMB, p. 127-136.
Rutten, J., "Application of the Waelz Technology on Resource Recycling of Steel Mill Dust", Heft 109 der Schriftenreihe der GDMB, p. 63-76.
Steinlechner, S., et al., "Hydro and Pyrometallurgical Options for the Upgrading of Low Grade Secondary Zinc Oxides", EMC 2011, p. 533-544.
Ullmann: Enzyklopädie der Technischen Chemie, 4. Auflage, Bd. 9; p. 102.
Hofkirchner, W., "Electrolytic galvanizing of steel strips and other metal coatings using the Gravitel process", Fachberichte Hüttenpraxis Metallweiterverarbeitung, vol. 24, No. 1 (1886), with English Translation, p. 1042-1044.
Gordon, A. R. et al., "Improved Leaching Technologies in the Electrolytic Zinc Industry", Metallurgical Transactions B, vol. 6B, Mar. 1975, p. 43-52.
Hartinger, L., Handbuch der Abwasser-und Recyclingtechnik, C. Hanser Verlag München, Wien 1990, p. 228-229.
GMELIN: Handbuch der Anorganischen Chemie, System Nr. 39, p. 113.

(Continued)

*Primary Examiner* — Melissa S Swain
(74) *Attorney, Agent, or Firm* — Lewis Roca Rothgerber Christie LLP

(57) ABSTRACT

Embodiments of the invention relate to a process for removing fluoride from a solution or suspension containing zinc, in particular a solution of zinc sulfate, a defluoridated solution of zinc sulfate obtainable by such a process, its use as well as processes for producing zinc and hydrogen fluoride or hydrofluoric acid. The process for removing fluoride comprises (i) providing a solution or suspension A containing zinc, wherein the solution or suspension A containing zinc further contains fluoride ions; (ii) adding a solution B containing a dissolved salt of a rare earth element to the solution or suspension A containing zinc, wherein a solid comprising a rare earth element fluoride and a solution C containing zinc are formed; and (iii) separating the solid from the solution C containing zinc, wherein the solution C containing zinc has a lower concentration of fluoride ions than the solution or suspension A containing zinc.

16 Claims, No Drawings

(56) References Cited

OTHER PUBLICATIONS

"Waelz process", Wikipedia, 3 pages.
English Translations of relevant paragraphs of the non-English Literatures, 3 pages.
Haiki, K. et al, "Zinc electrowinning by using leaching solution of secondary ZnO", Lead and Zinc 2010, Minerals, Metals, Materials Co. 2010, p. 667-675.
Offenthaler, D. et al., "Problemstellungen und Lösungsansätze in der Aufarbeitung zinkhältiger Stahlwerksstäube", Heft 109 der Schriftenreihe der GDMB, p. 17-24.
Korean Office action for Application No. 10-2019-7032590, dated Sep. 29, 2021, 9 pages.
First Office action issued in parallel Chinese Application No. 201780089320.0, dated Dec. 29, 2020, 20 pages.

\* cited by examiner

METHOD FOR REMOVING FLUORIDE FROM A ZINC-CONTAINING SOLUTION OR SUSPENSION, DEFLUORIDATED ZINC SULFATE SOLUTION AND USE THEREOF, AND METHOD FOR PRODUCING ZINC AND HYDROGEN FLUORIDE OR HYDROFLUORIC ACID

CROSS REFERENCE TO RELATED APPLICATION(S)

This application is the U.S. national phase of International Application No. PCT/EP2017/058303 filed 6 Apr. 2017 which designated the U.S., the entire content of which is hereby incorporated herein by reference.

FIELD OF THE INVENTION

Embodiments of the invention relate to a process for removing fluoride from a solution or suspension containing zinc, in particular a solution of zinc sulfate, a defluoridated solution of zinc sulfate obtainable by such a process as well as its use in the fertilizer industry, the viscose silk industry or feeding stuff industry or in the production of fertilizers, viscose silk (rayon) or feeding stuff. Further embodiments of the invention relate to processes for producing zinc, in particular for the hydrometallurgical recovery of zinc, as well as to processes for producing hydrogen fluoride or hydrofluoric acid.

BACKGROUND

For the primary zinc industry, but also for the zinc sulfate industry, such as the fertilizer industry or feeding stuff industry, secondary raw materials, in particular having a low iron content and a high zinc content, become more and more important. A limiting factor in this connection is often the fluorine content of the secondary raw materials, for which reason the processing of secondary raw materials is generally limited and nevertheless these secondary raw materials usually have to be subjected to a thermal treatment, which in turn often leads to disadvantages, such as corrosive exhaust gases, as well as to difficulties in the selective recovery of lead as a byproduct. On the other hand, a too high fluorine content of the secondary raw materials leads to massive problems in the hydrometallurgical recovery of zinc which forms the basis of at least 85% of the global zinc production. Also in the agricultural chemistry, a drastic reduction of the fluoride contents is of great importance for the production of mineral fertilizers with additives of zinc sulfate because cultivated plants may tolerate in general only very low amounts of soluble fluorides.

Thus, there is a need to refine fluoride-loaded zinc secondary raw material, such as waelz oxides, in particular to defluoridate the same, such that they may be employed in the primary zinc industry or for the production of zinc sulfate without suffering from the above described limitations or disadvantages.

OBJECTS OF THE INVENTION

Thus, there may be a need to provide a process by means of which a solution or suspension containing zinc, which has been obtained for instance from a fluoride-loaded zinc secondary raw material, may be defluoridated so that such fluoride-loaded zinc secondary raw material may be made available for the primary zinc industry or the zinc sulfate industry, in particular for the hydrometallurgical recovery of zinc, without the occurrence of limitations or problems due to fluoride contents. In addition, it is aimed that such process may be carried out economically efficient and resource-conserving, and thus environmentally friendly, as possible. Moreover, there may be a need to provide a solution of zinc sulfate having a very low fluoride content so that it may be utilized in the fertilizer industry, in precipitation baths of the viscose silk industry or feeding stuff industry or in the production of fertilizers, viscose silk or feeding stuff. Furthermore, there may be a need to be able to obtain both zinc or zinc sulfate and hydrofluoric acid from a fluoride-loaded zinc secondary raw material.

SUMMARY OF THE INVENTION

The inventors of the invention have carried out extensive studies for solving these objects and have in particular found that fluorides may be precipitated almost quantitatively from a solution or suspension containing zinc and separated in an efficient manner by means of solutions of salts of rare earth elements.

Accordingly, an exemplary embodiment of the invention relates to a process for removing fluoride from a solution or suspension containing zinc, in particular a solution of zinc sulfate, the process comprising the steps of:
  (i) providing a solution or suspension A containing zinc, wherein the solution or suspension A containing zinc further contains fluoride ions;
  (ii) adding a solution B containing a dissolved salt of a rare earth element to the solution or suspension A containing zinc, wherein a solid comprising a rare earth element fluoride and a solution C containing zinc are formed;
  (iii) separating the solid from the solution C containing zinc, wherein the solution C containing zinc has a lower concentration of fluoride ions than the solution or suspension A containing zinc.

In addition, an exemplary embodiment of the invention relates to a defluoridated solution of zinc sulfate, obtainable by a process for removing fluoride from a solution or suspension containing zinc according to the invention, wherein the solution has a content of fluoride of at most 10 mg/l.

The defluoridated solution of zinc sulfate according to the invention may be processed or used in various manner, for instance in the fertilizer industry, in precipitation baths of the viscose silk industry or feeding stuff industry or in the production of fertilizers, viscose silk and feeding stuff and for the hydrometallurgical production of zinc.

Thus, an exemplary embodiment of the invention relates to the use of a defluoridated solution of zinc sulfate according to the invention for the production of fertilizers, viscose silk and/or feeding stuff.

Furthermore, an exemplary embodiment of the invention relates to a process for producing zinc from a composition containing zinc oxide, in particular waelz oxide, the process comprising the steps of:
  providing an apparatus configured for hydrometallurgical recovery of zinc;
  performing a hydrometallurgical recovery of zinc from a defluoridated solution of zinc sulfate according to the invention by means of the apparatus configured for hydrometallurgical recovery of zinc.

A further exemplary embodiment of the invention relates to a process for producing zinc from a composition containing zinc oxide, in particular waelz oxide, the process comprising the steps of:
  providing an apparatus configured for hydrometallurgical recovery of zinc;
  performing a process for removing fluoride from a solution or suspension containing zinc according to the invention in another apparatus;
  performing a hydrometallurgical recovery of zinc from the solution C containing zinc by means of the apparatus configured for hydrometallurgical recovery of zinc.

Furthermore, an exemplary embodiment of the invention relates to a process for producing hydrogen fluoride or hydrofluoric acid, the process comprising the steps of:
  performing a process for removing fluoride from a solution or suspension containing zinc according to the invention;
  treating the solid comprising a rare earth element fluoride with an acid, in particular sulfuric acid, wherein hydrogen fluoride (HF) and a solution of a salt, in particular a sulfate, of the rare earth element are formed;
  separating the hydrogen fluoride (HF) from the solution of the salt of the rare earth element, for instance by means of distillation.

Other objects and advantages of embodiments of the invention will be readily appreciated by means of the following detailed description.

DETAILED DESCRIPTION OF THE INVENTION

Hereinafter, details of embodiments of the invention and further embodiments thereof will be described. However, the invention is not limited to the following specific descriptions, but they are rather only for illustrative purposes of the inventive teachings.

It should be noted that features described in connection with one exemplary embodiment or exemplary aspect may be combined with any other exemplary embodiment or exemplary aspect. In particular, features described in connection with any exemplary embodiment of the process for removing fluoride may be combined with any further exemplary embodiment of the process for removing fluoride as well as with any exemplary embodiment of the defluoridated solution of zinc sulfate, its use as well as any exemplary embodiment of the processes for producing zinc and hydrogen fluoride or hydrofluoric acid, and vice versa, unless specifically stated otherwise.

Where an indefinite or definite article is used when referring to a singular term, such as "a", "an" or "the", a plural of that term is also included and vice versa, unless the context clearly dictates otherwise. The expression "comprising", as used herein, includes not only the meaning of "comprising", "including" or "containing", but may also encompass "consisting essentially of" and "consisting of".

In the process for removing fluoride from a solution or suspension containing zinc, a solution or suspension A containing zinc is provided in a (first) process step (step (i)), wherein the solution or suspension A containing zinc further contains fluoride ions. The solution or suspension A containing zinc may in particular be a solution of zinc sulfate.

In an exemplary embodiment, the solution or suspension A containing zinc is formed by at least partly dissolving a composition containing zinc oxide, in particular waelz oxide. In other words, it is possible that the composition containing zinc oxide is completely or partly dissolved. In case of a complete dissolution of the composition containing zinc oxide, a solution A containing zinc is formed, while in case of a partial dissolution of the composition containing zinc oxide, a suspension A containing zinc is formed.

In an exemplary embodiment, the composition containing zinc oxide is a fluoride-containing zinc secondary raw material, such as waelz oxide.

A "waelz oxide" within the meaning of the invention is generally referred to the main product of a Waelz process. The "Waelz process" is generally referred to a metallurgical process for recycling of waste materials containing zinc, such as steel mill dusts, electric furnace steel filter dusts or electric arc furnace flue dusts, in a rotary kiln or rotary furnace. Accordingly, waelz oxide within the meaning of embodiments of the invention contains zinc oxide (ZnO), in particular as a main component thereof. In addition, waelz oxide in general further contains disturbing impurities, such as fluorine or fluoride, lead and others (see also Table 1). Prior to or after the defluoridation, disturbing lead is precipitated for instance by means of $H_2S$ or is well cemented by means of zinc. A further development of the Waelz process with reduced energy consumption represents the SDHL Waelz process, named after the inventors Saage, Dittrich, Hasche and Langbein.

In the following Table 1, typical compositions of waelz oxides from the SDHL Waelz process are summarized, wherein "waelz oxide (washed)" means that (unwashed) waelz oxide has been subjected to a leaching by means of hot diluted soda solution:

TABLE 1

Typical compositions of waelz oxides from the SDHL Waelz process

| wt.-% | waelz oxide (unwashed) | waelz oxide (washed) |
| --- | --- | --- |
| Zn | 55-65 | 65-68 |
| Pb | 2.3-5.5 | 3.9-6.0 |
| FeO | 2.1-5.4 | 3.0-6.0 |
| CaO | 1.4-4.0 | 1.8-4.5 |
| MgO | 0.2-0.5 | 0.3-0.6 |
| $SiO_2$ | 0.2-1.5 | 0.4-2.0 |
| Cl | 0.1-6.4 | 0.05-0.2 |
| F | 0.1-0.5 | 0.1-0.25 |
| S | 0.2-1.0 | 0.1-0.5 |
| $K_2O$ | 0.05-3.9 | 0.04-0.1 |
| $Na_2O$ | 0.3-3.1 | 0.1-0.3 |

Such compositions containing zinc oxide typically contain various components, as evident from the above Table 1 as an example, so that it is possible that in case of a partial dissolution of the composition containing zinc oxide, the existing zinc substantially completely dissolves and the insoluble residue does not contain any or at most traces of zinc. However, it is also possible that in case of a partial dissolution of the composition containing zinc oxide, a part of the existing zinc remains in the insoluble residue, in particular in the form of hardly soluble zinc salts, but wherein at least a part of the existing zinc, in particular a predominant part of the existing zinc, for instance at least 70%, in particular at least 80%, in particular at least 85%, in particular at least 90%, in particular at least 95% of the existing zinc, dissolves and is consequently present as zinc ions ($Zn^{2+}$ ions) in the solution. In case of a merely partial dissolution of the composition containing zinc oxide, it is also possible to separate the insoluble residue, for instance by means of filtration or centrifugation, and to use the thus obtained (clear) solution as the solution A containing zinc.

In a preferred embodiment, the composition containing zinc oxide is substantially completely dissolved to give a (aqueous) solution A containing zinc.

In an exemplary embodiment, the composition containing zinc oxide is at least partly dissolved by means of an acid to form the solution or suspension A containing zinc. Sulfuric acid has turned out to represent the most versatilely suitable acid, while also other acids, in particular other mineral acids, may be used for at least partly dissolving the composition containing zinc oxide, as long as they do not form hardly soluble salts with in particular zinc and their acidity is sufficient for dissolving of in particular zinc oxide. The concentration of the acid used is not particularly limited and is for instance in case of sulfuric acid a 10 to 20% sulfuric acid, such as a 15% sulfuric acid.

In some embodiments, it is advantageous to carry out the at least partial dissolution of the composition containing zinc oxide at an elevated temperature, for instance at a temperature within the range of from 50 to 80° C., in particular from 60 to 70° C. A (preferably continuous) stirring may also positively influence the at least partial dissolution of the composition containing zinc oxide. The time period for the at least partial dissolution of the composition containing zinc oxide is not particularly limited and is for instance 10 minutes to 2 hours, in particular 30 minutes to 1 hour. An end of the dissolution process may be realized in that the pH value of the aqueous solution does substantially not (or no longer) change with advancing duration. By way of illustration, in an at least partial dissolution of washed waelz oxide by means of 15% sulfuric acid, a (constant) final pH value of about 4 is for instance reached after about 40 minutes at a temperature of about 65° C. while permanently stirring.

In the process for removing fluoride from a solution or suspension containing zinc, a solution B containing a dissolved salt of a rare earth element is added to the solution or suspension A containing zinc in a further process step (step (ii)). Here, a solid comprising a rare earth element fluoride and a solution C containing zinc are formed. The solution C containing zinc has a lower concentration of fluoride ions than the solution or suspension A containing zinc.

In an exemplary embodiment, the solution B contains a dissolved sulfate of a rare earth element. It is generally possible to also use other salts of a rare earth element (or of several rare earth elements), such as nitrates, as long as they are highly soluble, in particular highly soluble in water, in particular highly soluble at a neutral or weakly acidic pH value.

It has turned out to be advantageous that the utilized rare earth element salt completely dissolves and that thus the solution B is a clear aqueous solution of a completely dissolved salt of a rare earth element. Hereby, it is possible to achieve an almost quantitative or substantially complete precipitation of the fluoride ions, which is basically only restricted by the solubility of the formed rare earth element fluoride, which may be calculated from the solubility product of the rare earth element fluoride and is slightly increased due to the neutral salt effect or the "salting in" effect. In other words, it is hereby possible to achieve the technically and physically least possible concentration of fluoride ions remaining in the solution C containing zinc. Moreover, it is hereby possible to adequately dose the required amount of rare earth element salt so as to achieve a substantial complete precipitation of the fluoride ions, while avoiding an unnecessary excess of the comparatively expensive rare earth element salt (also from the viewpoint of conserving of resources).

In some embodiments, it might be advantageous if the amount (molar amount or amount of substance) of the rare earth element salt added by means of the solution B is slightly hyperstoichiometric compared to the fluoride ions contained in the solution or suspension A containing zinc. For instance, the molar ratio of the ions of the rare earth element ($RE^{n+}/n$) (wherein RE represents a rare earth element and n represents its charge number) to fluoride ions (F), i.e.

$$\frac{[RE^{n+}]}{n \times [F^-]},$$

is in the range of from 1.01 to 1.5, in particular of from 1.02 to 1.4, in particular of from 1.03 to 1.3, such as from 1.05 to 1.2. An excess of the rare earth element salt results in a further shift of the precipitation equilibrium towards the precipitate of the rare earth element fluoride and thus to a particular effective precipitation of the fluoride ions and corresponding removal of the fluoride ions from the solution or suspension A containing zinc. If a remaining (i.e. not consumed by the fluoride ions) excess of the ions of the rare earth element is disturbing in the further use of the solution or suspension A containing zinc, it is advantageous to precipitate these excessive ions of the rare earth element by means of a salt whose anion forms a less hardly soluble rare earth element salt than rare earth element fluoride (so as to avoid the release of fluoride ions from the rare earth element fluoride again). As an example for such a salt, mention can be made of in particular ammonium oxalate whose anion (i.e. oxalate) forms a rare earth element oxalate being less hardly soluble rare earth element salt than the respective rare earth element fluoride.

In an exemplary embodiment, an amount of substance of the dissolved salt of a rare earth element is therefore added in step (ii), the amount being adapted to an estimated (for instance based on empirical values from previously used comparable zinc secondary raw materials) or previously determined (for instance determined by means of an analytically determined fluoride content in a previously retrieved sample of the solution or suspension A containing zinc, e.g. potentiometrically determined by means of a fluoride sensitive electrode) amount of substance of fluoride ions in the solution or suspension A containing zinc. In this regard, it is advantageous to adapt such that the added amount (molar amount or amount of substance) of the rare earth element salt is slightly hyperstoichiometric compared to the estimated or previously determined amount of substance of fluoride ions in the solution or suspension A containing zinc, as explained in detail above. As also explained above, such adaptation or adequate metering is facilitated, if not even only made possible, if the solution B is a clear aqueous solution of a completely dissolved salt of a rare earth element.

In an exemplary embodiment, the rare earth element is selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). With regard to the availability, the rare earth element is preferably selected from the group consisting of lanthanum (La), cerium (Ce), praseodymium (Pr) and neodymium (Nd). In particular, it has turned out to be advantageous for cost efficiency if the rare earth element comprises cerium (Ce).

Combinations of rare earth element salts may also be used, for instance combinations of rare earth element salts having different rare earth elements but the same anion, combinations of rare earth element salts having the same rare earth element but different anions, and combinations of rare earth element salts having different rare earth elements and different anions.

In an exemplary embodiment, the salt of the rare earth element is cerium sulfate, such as in particular cerium(III) sulfate ($Ce_2(SO_4)_3$). In other words, the solution B contains for instance dissolved cerium sulfate.

For example, in case that the solution B contains cerium (III) sulfate ($Ce_2(SO_4)_3$), the precipitation reaction may be illustrated by the following reaction equation (1):

$$Ce_2(SO_4)_3 + 6F^- \rightarrow 2CeF_3 + 3SO_4^{2-} \quad (1)$$

In an exemplary embodiment, after adding the solution B to the solution or suspension A containing zinc, the pH value of a thus obtained mixture is buffered within the range of from 5.0 to 5.5. In such a weakly acidic to neutral environment, the precipitation of the fluoride ions by means of the rare earth element salt may be carried out in a particular efficient manner and it is in particular possible to achieve an almost quantitative or substantially complete precipitation of the fluoride ions in this environment.

Buffering of the pH value to a range of from 5.0 to 5.5 may be made for instance by means of the addition of zinc oxide (ZnO) as buffer substance (buffering agent), in particular in case the solution or suspension A containing zinc has been prepared from a composition containing zinc oxide by at least partial dissolution by means of an acid and thus rather has a more acidic pH value than 5.0 to 5.5. Here, the zinc oxide is added for instance to the solution or suspension A containing zinc, to the solution B and/or to the obtained mixture. The addition of zinc oxide may be made as long as the pH value is adjusted within the desired range. The zinc oxide may be added for instance in the form of a freshly prepared, fluoride-free zinc oxide suspension ("zinc oxide milk"). In some embodiments, it is advantageous to apply the zinc oxide in a slight excess. Hereby, it is generally possible to improve the filterability of the rare earth element fluoride which is always very fine grained and thus difficult to filtrate.

Alternatively, buffering of the pH value is also possible by means of other buffer substance, such as basic zinc carbonate, as long as the buffer substances do not negatively influence the precipitation of the rare earth element fluoride or do not disturb in the further processing or further use of the solution A containing zinc and/or of the solid.

In an exemplary embodiment, the addition of the solution B and thus also the incipient precipitation of the rare earth element fluoride is carried out at an elevated temperature, in particular within the range of from 70 to 805° C., in particular within the range of from 75 to 84° C., in particular within the range of from 77 to 83° C., in particular at about 80° C. This is advantageous in terms of a good separability, in particular filterability, of the formed solid.

In some embodiments, it is advantageous if the addition of the solution B to the solution or suspension A containing zinc is carried out slowly, for example in small portions while permanently stirring. In particular, it is hereby possible to repress the nucleation rate and to promote the crystal growth rate.

In some embodiments, it is advantageous to subject the solid comprising a rare earth element fluoride, such as the precipitated cerium fluoride ($CeF_3$), to a maturation process or aging process, for instance at a temperature within the range of from 70 to 85° C., in particular of from 75 to 80° C., while permanently stirring, for instance for a time period of from 30 minutes to 4 hours, in particular of from 1 to 3 hours, and only after a further time period of for instance from 12 to 18 hours, in particular of from 14 to 16 hours, while allowing the solid and the solution C containing zinc to cool down, to carry out a separation of the solid from the solution C containing zinc according to step (iii). Due to the maturation process or aging process, the crystals of the solids coarsen. Hereby, the separation of the solid from the solution C containing zinc, in particular by means of filtration through a (fine pored) filter is facilitated.

In an exemplary embodiment, small amounts (for instance traces) of $Fe^{3+}$ ions are present in or are added to, in particular in the form of ferric sulfate ($Fe_2(SO_4)_3$), the solution or suspension A containing zinc and/or the solution B. Hereby, it is possible to facilitate the sedimentation behavior of the (cryptocrystallinely to amorphously) precipitating rare earth element fluoride, such as cerium fluoride, in particular to improve its filterability. Without wishing to be bound to a theory, the inventors assume that the ferric sulfate hydrolyses in a weakly acidic precipitation mixture and, in doing so, forms basic ferric sulfates enveloping the rare earth element fluoride particles, in particular the $CeF_3$ particles, and thus promote their sedimentation. In an exemplary embodiment, $Fe^{3+}$ ions, in particular basic ferric sulfate ($Fe_2O(SO_4)_2$), are also formed from ferrous (Fe(II)) contained in traces in the solution or suspension A containing zinc and/or the solution B by oxidation, for instance by means of hydrogen peroxide ($H_2O_2$), e.g. by addition of some drops of perhydrol (33% $H_2O_2$), as illustrated by the following reaction equation (2):

$$2Fe(SO_4) + H_2O_2 \rightarrow Fe_2O(SO_4)_2 + H_2O \quad (2)$$

The solution C containing zinc has a lower concentration of fluoride ions than the solution or suspension A containing zinc.

In an exemplary embodiment, the solution or suspension A containing zinc has a content of fluoride of at least 17 mg/l, in particular of at least 25 mg/l, in particular of at least 50 mg/l. When using such a fluoride-loaded solution or suspension containing zinc as an electrolyte in the hydrometallurgical recovery of zinc, massive problems may occur. In particular, there is a risk that an undisturbed stripping of the zinc coating deposited in the course of the electrolysis on a cathode is not possible or that the stripping is extremely hindered.

In an exemplary embodiment, the solution C containing zinc has a content of fluoride of at most 10 mg/l, in particular of at most 8 mg/l, in particular of at most 6 mg/l. Hereby, it is to possible to ensure that the problems and disadvantages described above in connection with the use of a fluoride-loaded solution or suspension containing zinc are substantially avoided.

In the process for removing fluoride from a solution or suspension containing zinc, the formed solid comprising a rare earth element fluoride is separated from the solution C containing zinc by means of for instance filtration or centrifugation in a further process step (step (iii)).

In an exemplary embodiment, the separation of the solid from the solution C containing zinc is carried out such that subsequently both the solution C and the solid comprising a rare earth element fluoride may be further processed. This is advantageous in particular for cost efficiency, but also for conserving resources and thus for environmental reasons.

In an exemplary embodiment, the separation of the solid from the solution C containing zinc comprises at least a filtration process. Hereby, the solid may be separated from the solution C containing zinc in a particular simple and efficient manner and, in doing so, both the solution C containing zinc and the solid comprising a rare earth element fluoride are available for further processing or further use. The filtration process is not particularly limited. In particular, the pore size of the filter used may be selected depending on the particle size of the solid so as to achieve a substantially complete retention of the solid with an acceptable flow rate. Alternatively, the separation of the solid from the solution C containing zinc may also be carried out by means of centrifugation, allowing to settle and/or decanting.

The solution C containing zinc obtained after step (iii), is substantially freed from solids or turbidities and in particular represents a substantially clear solution having a—apart from dilution effects—substantially unchanged content of zinc compared to the solution or suspension A containing zinc, but having a reduced content of fluorides. The solution C containing zinc may thus be referred to a defluoridated solution C containing zinc, in particular a defluoridated solution of zinc sulfate.

Before discussing a potential further processing or further use of the thus obtained solution C containing zinc (see further below), the potential further processing or further use of the separated solid comprising a rare earth element fluoride is described in the following.

In an exemplary embodiment, a salt of a rare earth element is formed from the separated solid, which salt may be reused for the solution B. Thus, the salt of a rare earth element used in step B may be reused again and again and it is thus possible that the used salt of a rare earth element is not consumed, but is subject to a circuit (recycled). This is enormously advantageous in particular for cost efficiency, but also for conserving resources and thus for environmental reasons.

In an exemplary embodiment, the separated solid comprising a rare earth element fluoride is in particular reacted with an acid, such as sulfuric acid, which may also be referred to as a "displacement acid", so that a salt of a rare earth element, such as a sulfate of a rare earth element, is formed from the rare earth element fluoride, which may be reused for the solution B. By doing so, zinc oxide that might also be contained in the separated solid also dissolves, for instance in the form of zinc sulfate, and may be as such also added to the solution B. The same holds true for possible iron salts that might be contained in the separated solid, which dissolve for instance in the form of ferrous sulfate and which may be as such also added to the solution B. In an exemplary embodiment, the separated solid is reacted with semi-concentrated sulfuric acid (e.g. having a content of about 40 to 60 wt.-% $H_2SO_4$) while heating.

The following reaction equation (3) illustrates the exemplary reaction of cerium fluoride ($CeF_3$) with sulfuric acid:

$$2\ CeF_3 + 3\ H_2SO_4 \rightarrow Ce_2(SO_4)_3 + 6\ HF \qquad (3)$$

As it is evident from the reaction equation (3), in addition to the salt of a rare earth element (in the present case, cerium(III) sulfate) which may be reused for the solution B, hydrogen fluoride (HF) is also formed which may be recovered.

Therefore, an exemplary embodiment of the invention also relates to a process for producing hydrogen fluoride or hydrofluoric acid, the process comprising the steps of:

performing a process for removing fluoride from a solution or suspension containing zinc according to the invention;

treating the solid comprising a rare earth element fluoride with an acid, in particular sulfuric acid, wherein hydrogen fluoride (HF) and a solution of a salt, in particular a sulfate, of the rare earth element are formed;

separating the hydrogen fluoride (HF) from the solution of the salt of the rare earth element.

In an exemplary embodiment, the separation of the hydrogen fluoride (HF) from the solution of the salt of the rare earth element comprises a distillation process. Here, the hydrogen fluoride is distilled off as hydrogen fluoride vapour and collected in a receiver containing water to give hydrofluoric acid. Because of the very aggressive and strongly etching quality of hydrogen fluoride or hydrofluoric acid, it is advantageous if the distillation apparatus is made of a material resistant to hydrogen fluoride or hydrofluoric acid, such as of Teflon (polytetrafluoroethylene).

Hydrogen fluoride or hydrofluoric acid is a versatilely usable chemical which may be sold profitably.

In an exemplary embodiment, the separated solution of the salt of the rare earth element is reused as a component of the solution B so that a substantially closed circuit (loop) with regard to salt of the rare earth element may be realized.

As already announced above, the defluoridated solution C containing zinc, in particular a defluoridated solution of zinc sulfate, may be further processed or used.

Thus, an exemplary embodiment of the invention also relates to a defluoridated solution of zinc sulfate, obtainable by a process for removing fluoride from a solution or suspension containing zinc according to the invention, wherein the solution has a content of fluoride of at most 10 mg/l.

In an exemplary embodiment, the defluoridated solution of zinc sulfate has a content of fluoride of at most 9 mg/l, in particular of at most 8 mg/l, in particular of at most 7.5 mg/l, in particular of at most 7 mg/l, in particular of at most 6 mg/l.

The lower limit of the content of fluoride in particular depends on the solubility of the rare earth element fluoride formed in the course of the process, as described in detail above in connection with the almost quantitative or substantially complete precipitation of the fluoride ions, wherein of course contents of fluoride below the solubility calculated from the solubility product may be achieved by diluting the solution of zinc sulfate with water. For example, the solubility of cerium fluoride ($CeF_3$) is 4.22 mg/l. In an exemplary embodiment, the defluoridated solution of zinc sulfate then has a content of fluoride of at least 1 mg/l, in particular of at least 2 mg/l, in particular of at least 3 mg/l, in particular of at least 4 mg/l, in particular of at least 4.5 mg/l.

The defluoridated solution of zinc sulfate may be processed or used in various manner, for instance in the fertilizer industry, in precipitation baths of the viscose silk industry or feeding stuff industry or in the production of fertilizers, viscose silk and feeding stuff and for the (in particular hydrometallurgical) production of zinc.

Thus, an exemplary embodiment of the invention also relates to the use of a defluoridated solution of zinc sulfate according to the invention for the production of fertilizers, viscose silk and/or feeding stuff.

A further exemplary embodiment of the invention further relates to a process for producing zinc from a composition containing zinc oxide, in particular waelz oxide, the process comprising the steps of:

providing an apparatus configured for hydrometallurgical recovery of zinc;

performing a hydrometallurgical recovery of zinc from a defluoridated solution of zinc sulfate according to the invention by means of the apparatus configured for hydrometallurgical recovery of zinc.

A still further exemplary embodiment of the invention relates to a process for producing zinc from a composition containing zinc oxide, in particular waelz oxide, the process comprising the steps of:

providing an apparatus configured for hydrometallurgical recovery of zinc;

performing a process for removing fluoride from a solution or suspension containing zinc according to the invention in another apparatus;

performing a hydrometallurgical recovery of zinc from the solution C containing zinc by means of the apparatus configured for hydrometallurgical recovery of zinc.

In order not to hinder the hydrometallurgical zinc recovery process, the removal of fluoride is carried out in a separate apparatus, for example in a separate heatable agitator vessel, in parallel connection.

Embodiments of the invention are further described by means of the following examples, which are solely for the purpose of illustrating the inventive teachings, and shall not be construed as limiting the scope of the invention in any way.

EXAMPLES

A stock solution having a zinc content of 45 g/l was prepared from washed waelz oxide having a composition as shown in the following Table 2 by neutral leaching using diluted (15%) sulfuric acid.

TABLE 2

Composition of the waelz oxide used for the defluoridation experiments

| Component | Content [wt.-%] | Component | Content [wt.-%] |
|---|---|---|---|
| F | 0.24 | Mg | 0.18 |
| Cl | 0.1 | Mn | 0.22 |
| SO$_4$ | 0.44 | Pb | 4.8 |
| Ca | 1.1 | Zn | 67.0 |
| Fe | 2.8 | Si | 0.22 |

The concentration of zinc was adjusted by reacting 79.017 g waelz oxide with 450.06 g $H_2SO_4$ (15%), that is 409.1 ml.

By doing so, 85% of the zinc oxide of the furnished amount of waelz oxide dissolved. This leaching corresponds to a neutral leaching with a final pH value of 4. With these leaching conditions, a partial dissolution of silicates (from gangue parts upon forming of colloidal silicic acid clogging filter pores and thus hindering the filtration process after the neutral leaching) was avoided. During the neutral leaching, the suspension was continuously stirred. The leaching temperature was 65° C., the leaching time was 40 minutes. The end of the neutral leaching could be observed by pH constancy.

After completion of the neutral leaching, the residue of the neutral leaching was separated from the mother liquor by filtration. The colorless and clear filtrate was transferred in a 1 liter volumetric flask and diluted until the measuring mark. The content of the 1 liter volumetric flask was transferred in two 500 ml volumetric flasks.

The content of one 500 ml volumetric flask was used for the determination of the zinc and fluorine contents of the stock solution, the content of the second 500 ml volumetric flask was transferred in a 800 ml beaker and slowly, dropwise, mixed with a slightly hyperstoichiometric amount of cerium(III) nitrate dissolved in about 50 ml water. The stoichiometricially required amount of $Ce(NO_3)_3 \cdot 6H_2O$ was calculated from the fluorine content of the waelz oxide as follows:

$$(0.24/100) \times 79.017 \times 0.5 = 0.09482 \text{ g or } 94.82 \text{ mg fluorine}$$

This amount of fluorine requires:

$$94.82 \times (434.22/56.995) = 722.4 \text{ mg } Ce(NO_3)_3 \cdot 6H_2O$$

Explanation of the numbers:
0.24=fluorine content of the waelz oxide [wt.-%]
434.22=molar mass of $Ce(NO_3)_3 \cdot 6H_2O$ [g/mol]
79.017=weighted sample of waelz oxide [g]
56.995=3 times the molar mass of fluorine [g/mol]

In the course of the dropwise addition of the $Ce(NO_3)_3$ solution, the solution became turbid by precipitated cerium (III) fluoride. In order to improve its sedimentation, a few drops of perhydrol ($H_2O_2$, 33%) was added to the suspension. In doing so, ferrous (Fe(II)) present in traces in the suspension oxidized to give basic ferric sulfate according to the reaction equation (2).

Since basic ferric sulfate tends to hydrolyze and in doing so forms sulfuric acid, some basic zinc carbonate was added to the suspension. As a consequence, the slightly fallen pH value was raised again to the value of 5.

The suspension thus obtained was stirred for 2 hours at a temperature of from 70 to 80° C. and only thereafter cooled down. The suspension was allowed to stand for 14 hours for sedimenting the solid. Only thereafter, the solid brownish colored by FeO(OH) was filtered off and washed with cold water.

The filtrate was transferred again in a 500 ml volumetric flask and diluted until the measuring mark. Subsequently, the zinc and fluorine contents of the thus obtained solution were determined. In line with the above described preparation and measurement scheme, all in all 3 defluoridation experiments were carried out. The results of the measurements can be taken from the following Table 3.

TABLE 3

Results of the defluoridation experiments by precipitating fluoride ions from a zinc sulfate solution by means of $Ce^{3+}$ ions

| | Content of the zinc sulfate solution | |
|---|---|---|
| | Before the precipitation | After the precipitation |
| Experiment 1 | | |
| Zn | 48.1 g/l | 45.8 g/l |
| F | 54.0 mg/l | 6.0 mg/l |
| Experiment 2 | | |
| Zn | 48.4 g/l | 48.4 g/l |
| F | 59.0 mg/l | 4.0 mg/l |
| Experiment 3 | | |
| Zn | 50 g/l | 49.8 g/l |
| F | 63 mg/l | 4.5 mg/l |

As it is evident from the measurement results, the zinc contents of the sample solutions are not significantly influenced by the precipitation of fluoride. The zinc contents of the sample solutions before and after the precipitation of fluoride are substantially the same.

The fluoride contents of the sample solutions to be defluoridated are however largely lowered by the addition of a stoichiometric (or a slightly hyperstoichiometric) amount of $Ce^{3+}$ ions in a weakly acidic to neutral solution.

Even though the equilibrium solubility calculated from the solubility product is not always achieved because of the neutral salt effect, nevertheless final fluoride contents are achieved that allow for an undisturbed stripping of the zinc coating from the Al cathodes in the hydrometallurgical recovery of zinc.

It is thus possible to refine and use fluoride-containing zinc secondary raw materials, such as washed waelz oxide, for the hydrometallurgical recovery of zinc by means of the process for removing fluoride from a solution or suspension containing zinc according to the invention.

Embodiments of the invention have been described by way of specific embodiments and examples. The invention is however not limited thereto and various modifications thereof are possible, without departing from the scope of the invention.

The invention claimed is:

1. A process for removing fluoride from a solution or suspension containing zinc, the process comprising the steps of:
   (i) providing a solution or suspension A containing zinc, wherein the solution or suspension A containing zinc further contains fluoride ions;
   (ii) adding a solution B containing a dissolved salt of a rare earth element to the solution or suspension A containing zinc, wherein a solid comprising a rare earth element fluoride and a solution C containing zinc are formed;
   (iii) separating the solid from the solution C containing zinc, wherein the solution C containing zinc has a lower concentration of fluoride ions than the solution or suspension A containing zinc.

2. The process according to claim 1, wherein the solution or suspension A containing zinc is formed by at least partly dissolving a composition containing zinc oxide, wherein the composition containing zinc oxide is at least partly dissolved to form the solution or suspension A containing zinc.

3. The process according to claim 1, wherein the solution B contains a dissolved sulfate of a rare earth element.

4. The process according to claim 1, wherein the rare earth element is selected from the group consisting of lanthanum (La), cerium (Ce), praseodymium (Pr) and neodymium (Nd).

5. The process according to claim 1, wherein in step (ii) an amount of substance of the dissolved salt of a rare earth element is added, the amount being adapted to an estimated or previously determined amount of substance of fluoride ions in the solution or suspension A containing zinc.

6. The process according to claim 1, wherein, after adding the solution B to the solution or suspension A containing zinc, the pH value of a thus obtained mixture is buffered within a range of from 5.0 to 5.5.

7. The process according to claim 1, wherein the separation of the solid from the solution C containing zinc is carried out such that subsequently both the solution C and the solid may be further processed.

8. The process according to claim 1, wherein the solution or suspension A containing zinc has a content of fluoride of at least 17 mg/l.

9. The process according to claim 1, wherein a salt of a rare earth element is formed from the separated solid, which salt may be reused for the solution B.

10. The process according to claim 2, wherein the composition containing zinc oxide is at least partly dissolved by means of an acid, to form the solution or suspension A containing zinc.

11. The process according to claim 1, wherein the dissolved salt of a rare earth element is cerium sulfate.

12. The process according to claim 1, wherein the rare earth element comprises cerium (Ce).

13. The process according to claim 6, wherein the pH value is buffered within the range of from 5.0 to 5.5 by means of addition of zinc oxide (ZnO).

14. The process according to claim 1, wherein the separation of the solid from the solution C containing zinc comprises at least a filtration process.

15. The process according to claim 1, wherein the solution C containing zinc has a content of fluoride of at most 10 mg/l.

16. The process according to claim 1, wherein the process for removing fluoride from a solution or suspension containing zinc is a process for removing fluoride from a solution of zinc sulfate.

* * * * *

UNITED STATES PATENT AND TRADEMARK OFFICE
CERTIFICATE OF CORRECTION

PATENT NO. : 11,512,368 B2
APPLICATION NO. : 16/603157
DATED : November 29, 2022
INVENTOR(S) : Fritz Ludewig, Stefan Steinlechner and Jürgen Antrekowitsch It is certified that error appears in the above-identified patent and that said Letters Patent is hereby corrected as shown below:

In the Specification

Starting Lines 37-38  Delete "2 Fe(SO$_4$) + H$_2$O$_2$ Fe$_2$O(SO$_4$)$_2$ + H$_2$O"
Insert -- 2 Fe(SO$_4$) + H$_2$O$_2$ → Fe$_2$O(SO$_4$)$_2$ + H$_2$O --

Starting Lines 58-59  Delete "2CeF$_3$ + 3 H$_2$504 Ce$_2$(SO$_4$)$_3$ +6 HF"
Insert -- 2CeF$_3$ + 3 H$_2$SO4 → Ce$_2$(SO$_4$)$_3$ +6 HF --

Signed and Sealed this
Seventh Day of March, 2023

Katherine Kelly Vidal
*Director of the United States Patent and Trademark Office*